United States Patent
Deshmukh et al.

(10) Patent No.: US 12,190,166 B1
(45) Date of Patent: Jan. 7, 2025

(54) SYSTEM AND METHOD FOR OBSERVING AND PREDICTING DATA BATCH ACTIVITY IN REAL TIME

(71) Applicant: Morgan Stanley Services Group Inc., New York, NY (US)

(72) Inventors: Vishal Deshmukh, Plainsboro, NJ (US); Sujit Eapen, Plainsboro, NJ (US); Himanshu Rout, Bengaluru (IN); Rashad Barron, Stroudsburg, PA (US); Rachit Mehrotra, Princeton, NJ (US); Tanmay Nagar, Mumbai (IN); Tejas Shah, Bengaluru (IN)

(73) Assignee: Morgan Stanley Service Group Inc., New York, NY (US)

( * ) Notice: Subject to any disclaimer, the term of this patent is extended or adjusted under 35 U.S.C. 154(b) by 0 days.

(21) Appl. No.: 18/739,658

(22) Filed: Jun. 11, 2024

(51) Int. Cl.
*G06F 9/50* (2006.01)

(52) U.S. Cl.
CPC ................... *G06F 9/505* (2013.01)

(58) Field of Classification Search
CPC ...................................... G06F 9/505
See application file for complete search history.

(56) References Cited

U.S. PATENT DOCUMENTS

| | | |
|---|---|---|
| 2003/0135621 A1 | 7/2003 | Romagnoli |
| 2005/0071843 A1 | 3/2005 | Guo et al. |
| 2005/0198636 A1 | 9/2005 | Barsness et al. |
| 2012/0042256 A1 | 2/2012 | Jamjoom et al. |
| 2014/0201747 A1 | 7/2014 | Pattnaik et al. |
| 2017/0046217 A1 | 2/2017 | Shinde et al. |
| 2018/0267831 A1 | 9/2018 | Nukariya et al. |
| 2020/0012520 A1 | 1/2020 | Bidkar |
| 2020/0301723 A1 | 9/2020 | Gabrielson et al. |
| 2020/0301741 A1 | 9/2020 | Gabrielson et al. |
| 2023/0056637 A1* | 2/2023 | Reyes .................. G06N 3/0442 |
| 2023/0359463 A1* | 11/2023 | Maman ................. G06F 9/5016 |

* cited by examiner

Primary Examiner — Charlie Sun
(74) Attorney, Agent, or Firm — Leason Ellis LLP

(57) ABSTRACT

A method for monitoring and predicting batch activity in real time comprises obtaining i) ordered lists of jobs from scheduling platforms and ii) information related to jobs from one or more file transfer sources including real time event information, extracting data from the ordered lists of jobs and file transfer information, enriching the extracted data using additional information retrieved from at least one meta data repository, and generating a dependency graph that includes real time job and file transfer data obtained from the enriched data in which nodes of the graph represent events and edges represent relationships between the nodes indicating a dependence. Critical milestones are obtained from the dependency graph, critical paths for traversing the dependency graph for job and file transfer execution, and times for execution of each of the jobs and file transfers in the critical paths are predicted in real time.

9 Claims, 8 Drawing Sheets

SYSTEM AND METHOD FOR OBSERVING AND PREDICTING DATA BATCH ACTIVITY IN REAL TIME

FIELD OF THE DISCLOSURE

The present disclosure relates to organizational data management, and more particularly, relates to a system and method for observing and predicting data batch activity in real time.

BACKGROUND OF THE DISCLOSURE

In certain fields, concentrated data processing occurs at the end of regular daily activity. This concentrated data processing is referred to as "batch" processing. For instance, in the financial field, end of day activity may include steps to resolve the positions and funds of clients after trading activity for book-keeping purposes. For organizations having complex internal networks with multiple platforms, batch processing can be challenging. For example, different divisions of an organization can employ their own scheduling platforms to schedule batch processing operations. There is often a lack of a supervisory system that can monitor and resolve conflicts between the various scheduling platforms.

More generally, there is typically a lack of visibility into batch processing as it occurs in real time. Technical personnel responsible for ensuring the accuracy of batch processing have difficulty tracking and determining the nature of errors due to this lack of real time oversight. Consequently, it is difficult to accurately predict when a particular batch process will complete as it may depend upon the fulfilment of preceding conditions ascertaining such conditions is not assured.

What is therefore needed is a system and method that provides such oversight and enables observance and prediction of data batch activity in real time.

SUMMARY OF THE DISCLOSURE

The present disclosure describes, in one aspect, a computer-implemented method for monitoring and predicting data batch activity in real time. The method comprises obtaining i) ordered lists of jobs of a batch from one or more scheduling platforms including and ii) information related to file transfers from one or more file transfer sources, the ordered lists and information related to file transfers being updated in real time, extracting data from the ordered and the information from the one or more file transfer sources, and enriching the extracted data using additional information retrieved from at least one meta data repository, generating a dependency graph that includes real time job and file transfer data obtained from the enriched data in which nodes of the graph represent events and edges represent relationships between the nodes indicating a dependence, wherein if one event is dependent on the execution of a prior event, the event is considered dependent on the prior event. The method further includes obtaining critical milestones from the dependency graph and the method, generating critical paths for traversing the dependency graph for job and file transfer execution using the milestones, and predicting in real time, times for execution of each of the jobs and file transfers in the critical paths.

In certain implementations, the method for monitoring and predicting data batch activity in real time further includes receiving notification of a specific failed job or file transfer, determining a failure code for the specific failed job or transfer, determining a position of the specific failed job or transfer in the dependency graph, obtaining historical data concerning failure modes of the jobs and file transfers, and determining whether recovery of an event class corresponding to the specific failed job or file transfer can be automated based on the failure code, position of the specific failed job or transfer in the dependency graph, and historical data corresponding to the failure code.

According to another aspect, the present disclosure describes a computer-implemented system for monitoring and predicting data batch activity in real time, executed using one or more processors. The system comprises a) a data capture module that is configured to: obtain i) ordered lists of jobs of a batch from one or more scheduling platforms including real time event information and ii) information related to jobs from one or more file transfer sources including real time event information; and extract data from the ordered lists of jobs and real time event information received from the one or more scheduling platforms and the information from the one or more file transfer sources. The system further includes b) a datamesh module coupled to the data capture module that is configured to enrich the extracted data using additional information retrieved from at least one meta data repository; and to generate a dependency graph that includes real time job and file transfer data obtained from the enriched data in which nodes of the graph represent events and edges represent relationships between the nodes indicating a dependence, wherein if one event is dependent on the execution of a prior event, the event is considered dependent on the prior event. The system also includes c) a prediction engine coupled to the datamesh module and configured to: obtain critical milestones from the dependency graph, generate critical paths for traversing the dependency graph for job and file transfer execution, and predict in real time, times for execution of each of the jobs and file transfers in the critical paths.

DESCRIPTION OF CERTAIN EMBODIMENTS OF THE DISCLOSURE

It is initially noted that a "module" or "engine" as used herein is a software program or group of software programs and related data that performs and/or controls a group of related processes. A module or engine can include applications, interfaces, libraries, scripts, procedure calls, and generally any code and data that is tailored for the processes that the module performs and controls. A module or engine can be executed using a single hardware processor, or multiple processors acting in concert. The processors can be hosted locally, externally (e.g., on the cloud) or any combination of the two.

The present disclosure describes a system and method for monitoring, managing and enabling predictive monitoring of batch-dependent processes in a complex network of systems. The system provides a schema that displays batch job orchestration as a network of nodes, providing a holistic view across multiple systems. The insight regarding the jobs is collated into a model that predicts completion and potential impacts on the relevant business process with knowledge of the dependencies between them.

A batch is a group of code-executable individual tasks. The individual tasks are referred to as "jobs" that are performed continuously in a scheduled order as a group on a regular basis. Batches are typically run at the end of day or overnight at the end of daily organizational activity. Each job is a discrete task, such as, for instance, updating a value in a database, performing a calculation, transmitting a communication (e.g., email, text message), or initiating a file transfer. Jobs may require the completion of other "predecessor" jobs in order to be executed themselves. For example, job A, which has the operation of transmitting data Y, may require the completion of job B, which has the operation of updating the value of Y from a prior value X. Extrapolating from these examples, in large batches (e.g., having over 100,000 jobs) there can arise a complex web of dependencies. In order to properly monitor batch processing in real time, it is necessary to know the dependencies between the jobs and the current status of the jobs. Categories of job status include completed, delayed, failed, or awaiting execution (without delay or failure).

Figure 1:
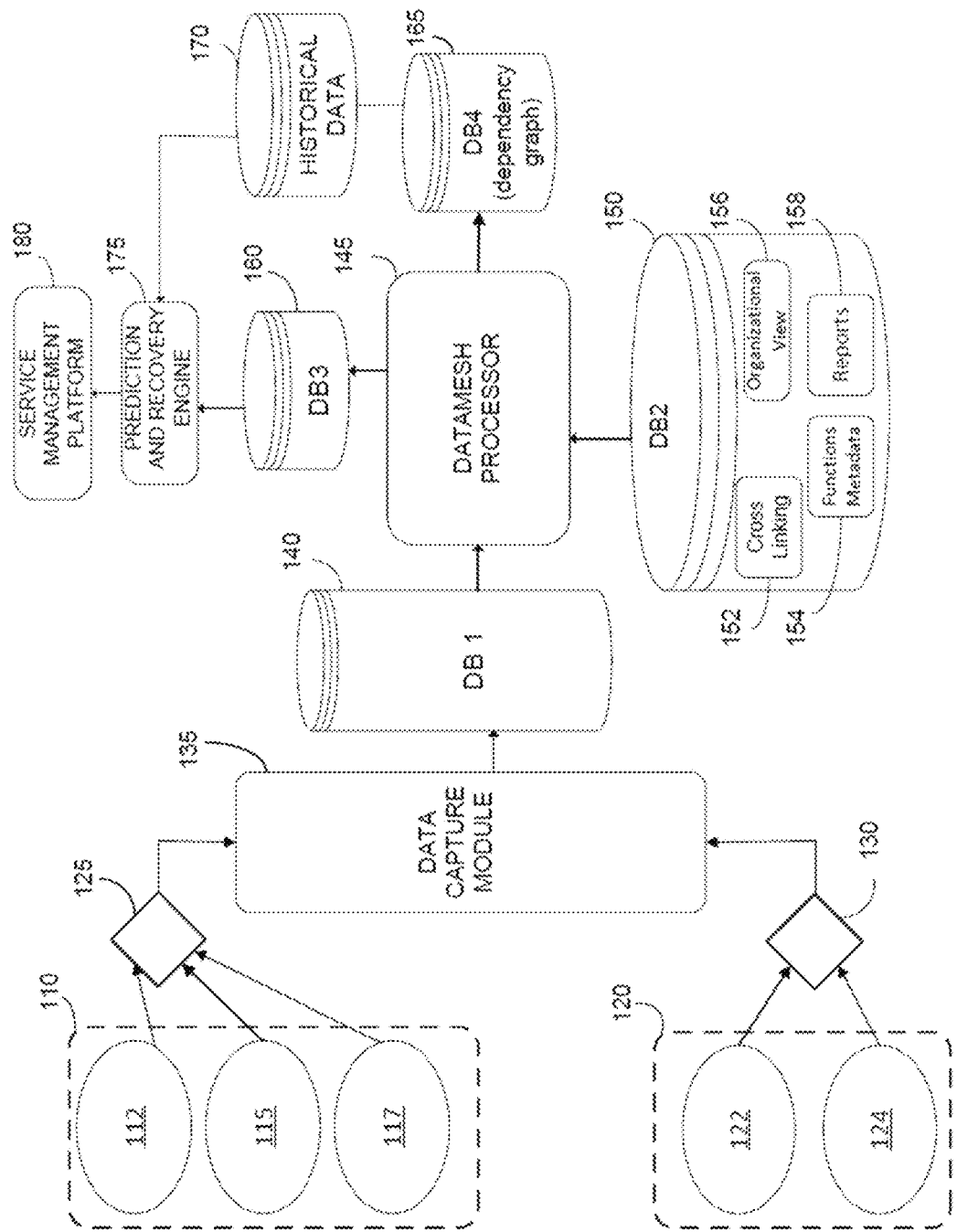
FIG. 1 is a schematic block diagram of a system for monitoring, managing and enabling predictive monitoring of batch-dependent processes in a complex network of systems according to an embodiment of the present disclosure.

FIG. 1 is a schematic block diagram of a system for monitoring, managing and enabling predictive monitoring of batch-dependent processes in a complex network of systems according to an embodiment of the present disclosure. Referring to the left-side of FIG. 1, the data sources upon which the system are shown. The data sources include scheduling sources 110 and file transfer sources 120. The scheduling sources 110, referred to as scheduling platforms, can be vendor scheduling applications such as, but not limited to, Autosys™ provided by Broadcom, Inc. of San Jose, California, ControlM™ provided by BMC Software Inc. of Houston, Texas, and IBM Tivoli™ Workload Scheduler ("TWS") provided by IBM Inc. of Armonk, New York. The scheduling platforms 110 list jobs in a planned sequential order for execution. Since the organization can employ multiple different scheduling sources as shown in FIG. 1, there can be conflicts and complex interdependencies between the platforms, which the platforms, in and of themselves are not equipped to resolve. In the exemplary system shown in FIG. 1, three scheduling platforms 112, 115 and 118 are deployed.

The file transfer sources 120 such as Connect:Direct, Comet and TWS are software programs that are configured to push data transfers, formatted as files, without specific requests (TWS is considered both a scheduling platform and a file transfer program). The file transfers are executed based upon configured conditions, which can be based on time, or the occurrence of an event. In the exemplary system shown, there are also three file transfer sources 118, 122, 125, with one of the file transfer sources 118 also serving as a scheduling source.

All of the scheduling platforms 112, 115, 118 are configured to transmit data files to a file connector 125 for input to a data capture module 135, and all of the file transfer programs 118, 122, 124 are configured to transmit message queueing files to a message queueing connector 130 for input to the data capture module 135.

Figure 2:
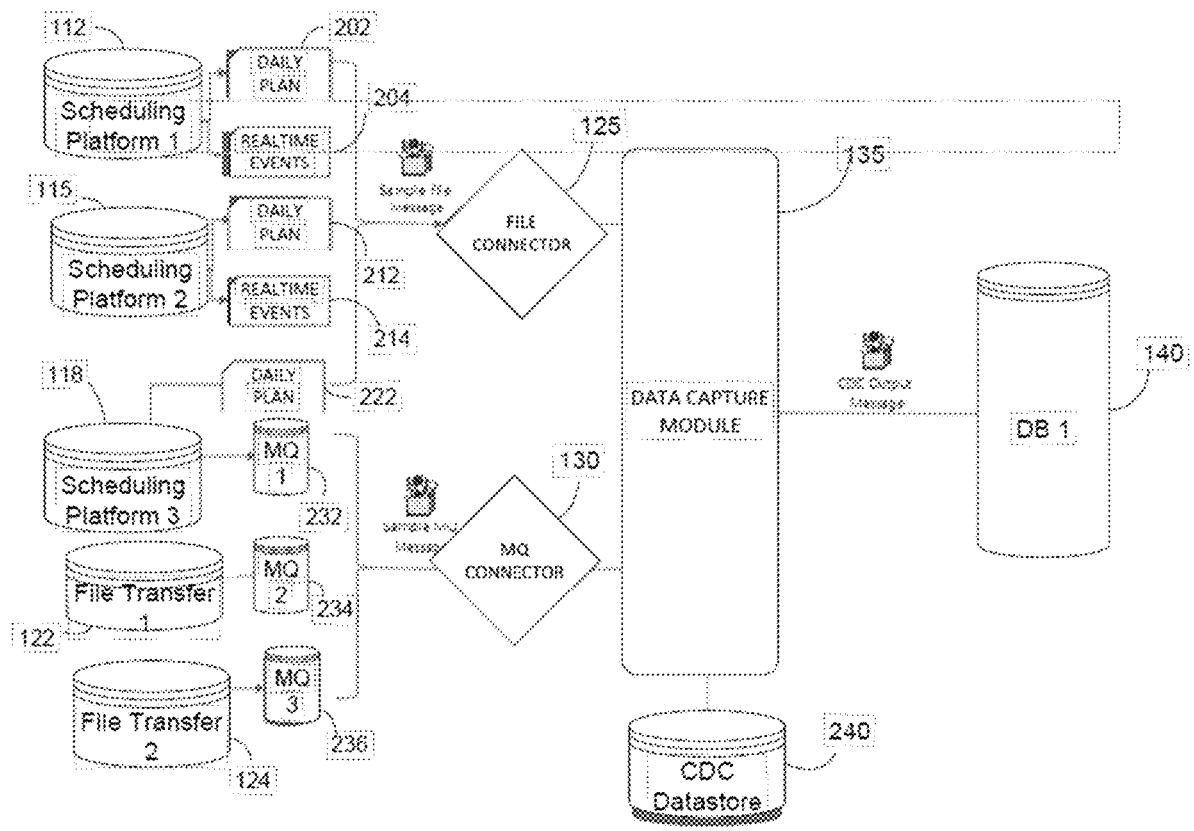
FIG. 2 is an enlarged and more detailed view of the source and data capture portions of FIG. 1.

Referring now to FIG. 2 which depicts an enlarged and more detailed view of the source and data capture portions of FIG. 1 discussed above, each of the scheduling platforms includes or has access to a daily job execution plan file and a log of real time events. More particularly, scheduling platform 112 includes daily plan file 202 and real-time event log 204, scheduling platform 115 includes daily plan file 212 and real-time event log 214, and hybrid scheduling platform 118 includes daily plan file 222. The daily plan files 202, 212, 222 contain information such as job identifiers, the number of jobs to be executed in a batch, as well as conditions that are required for jobs to be executed. The real-time event logs 204, 214 contain a list of items that are logged, such as the initiation and completion of jobs and the times at which they occur. The scheduling platforms 112, 115, 118 transmit the daily plan files 202, 212, 222 and real-time event logs 204, 214 in the form of file messages to the data capture module 135 via a first file connector 125.

Each of the file transfer programs includes or has access to a file transfer message queue: file transfer program 118 includes message queueing file (MQ) 232, file transfer program 122 includes message queueing file 234, and file transfer program 124 includes message queueing file 236. The file transfer programs 118, 122, 124 transfer data in the form of MQ message to the data capture module 135 via a second file connector 130.

Data capture module 135 is configured to receive the daily plan files 202, 212, 222 from the first file connector 125 and to parse the content of the various files to extract certain data fields. As the multiple scheduling platforms typically store data in different vendor formats, the parsing identifies the key data fields that are typically present in all of the files, regardless of the specific platform. Such fields include, for example, for each job: the name, operator, job predecessor, application, and expected start and ends times. After the files and been parsed and the data has been extracted, data capture module 135 is configured to translate and assemble the extracted data into a standard format for further processing. In some implementations, the standard format structure is a JSON template. Analogously, data capture module 135 is configured to receive the message queuing files from the second file connector 130 and parse the contents of the message queuing files. Similar data fields are extracted from the message queueing files as for the daily plan/events logs, such as, but not limited to, the name, operator (is this a human operator, responsible team?), predecessor, application, and expected start and end times of a file transfer. Data capture module 135 is also configured to translate and assemble the extracted data from the message queueing files into a standard format for further processing. In some implementations, the standard format structure is a JSON template. As the data is parsed, the data capture module 135 stores the extracted data locally in a CDC data store 240. Once the data has been assembled into the standard format structure, the data capture module 135 sends the assembled data in the standard format in an output message into the first database DB1 140 (also shown in FIG. 1). Database DB1 140 stages the data received from the data capture module 135 in a queue.

Returning to FIG. 1, a datamesh module 145 reads scheduled jobs and file transfer events from DB1 140 in real time, preferably in a first-in first-out (FIFO) order. The datamesh module 145 is configured to enrich the data received from database DB1 140 using additional data retrieved from several meta data repositories. Among the metadata repositories (shown collectively stored in database DB2 150) are data stores for: crosslinking repository 152; functions metadata 154; organizational view 156 and reports 158. The repositories 152-158 are periodically updated by administrators to ensure that the data is current. The crosslinking repository 152 contains information concerning how certain batches are linked to each other. For example, if a certain batch X includes job A, and the execution of A is required for executing a job B in batch Y, then batches X and Y are considered to be cross-linked for at least this pair of jobs. In instances in which different platforms 112, 115, 118 are responsible for cross-linked batches, the cross-linking repository 152 records the dependencies between the platforms.

Functions metadata 154 stores metadata that can be accessed by the datamesh module 145 using knowledge of the job name attributes. The function-related information includes data concerning the classification or purpose of each job. Example classifications/purposes include, but are not limited to, client communications (e.g., email, SMS), statement reporting, and book-keeping. The functions metadata 154 can also include additional information concerning applications that are used to execute the jobs/file transfers such as application names, support groups, and contact datalinks. Furthermore, the functions metadata 154 can be organized by function/sub-function to provide additional levels of data as well as implementation information.

The organizational view repository 156 stores additional job-related information that provides further insight into the function of the jobs/file transfers. The reports data repository 158 stores different types of reports from the datamesh module 145 gathers information from.

After receipt of the array of data and metadata concerning the jobs and file transfers, the datamesh module 145 is configured to systematically estimate the start time, end time and average run time of the jobs and file transfers. The estimation can be based on the times and durations of historical runs for each job. In some implementations the estimations can access databases including a vast amount of job history data (e.g., approximately 200,000 jobs). To access the job history data and for other data enrichment purposes, the datamesh module 145 can integrate with other internal systems of the organization (not shown). In certain circumstances the data enrichment operations performed by the datamesh on a particular event fail. In such cases, the datamesh module 145 delivers the event to another database DB3 160 which stores failed events for future auto-recovery procedures.

Notably, in order to perform the estimation, the datamesh module 145 first uses the predecessor data of the events received by the data capture module, along with additional metadata such as cross-linking data, to create a dependency graph for the various jobs and file transfers (collectively "events"). More particularly, the datamesh module 145 assigns the events as nodes of the graph, and assigns edges as the relationship between the nodes. The edges of the graph represent an order, or dependency, between the nodes. For example, an edge between nodes A and B may represent node A preceding node B, or, equivalently, node B depending upon node A. The edge includes a "direction" to indicate which way the dependency runs. The node/edge information for generating the graph is stored in another database DB4 165. The dependency graph illustrates relationships between the events in real time.

Figure 3:
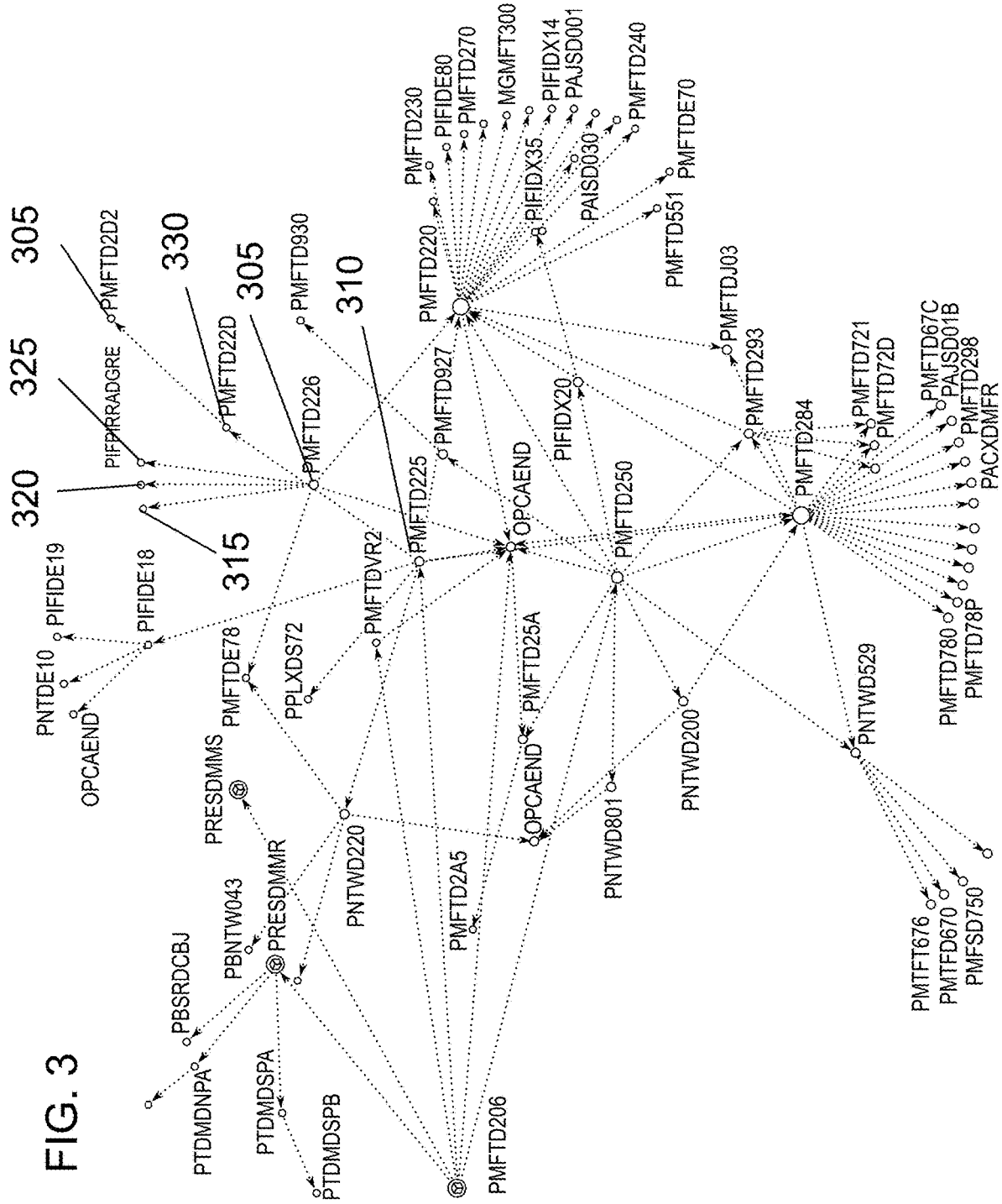
FIG. 3 is an example dependency graph generated by the datamesh module according to the present disclosure.

An exemplary dependency graph is shown in FIG. 3. Focusing on a particular set of relationships starting with node 305, it can be seen that node 305, which represents a certain job or file transfer event, is dependent on predecessor node 310. The event associated with node 305 requires completion of the event assigned node 310 in order to execute. The edge which connects nodes 305, 310 is accordingly shown as being directed from node 310 to node 305. Nodes 315, 320, 325 and 330 are, in turn, all dependent upon node 305. Accordingly, there is an edge pointing from node 305 to node 315, another edge pointing from node 305 to node 320, a further edge pointing from node 305 to node 325, and yet another edge pointing from node 305 to node 330. While an edge is directed to node 330 from node 305, another edge is directed from node 330 to another node 335. This indicates that the event associated with node 335 depends upon the prior execution of the event associated with node 330, which in turn, depends upon the execution of the event associated with node 305, as noted. As the event associated with node 305 depends upon the execution of the event associated with node 310, we see there is a cascade of dependencies: node 335 depends from node 330, which depends from node 305, which depends from node 310. A network of nodes and edges such as shown in FIG. 3 can be created for each scheduling platform 112, 115, 118. The graph presents a wealth of information that enables operators to determine a critical path for a batch run for a scheduling platform.

Figure 4:
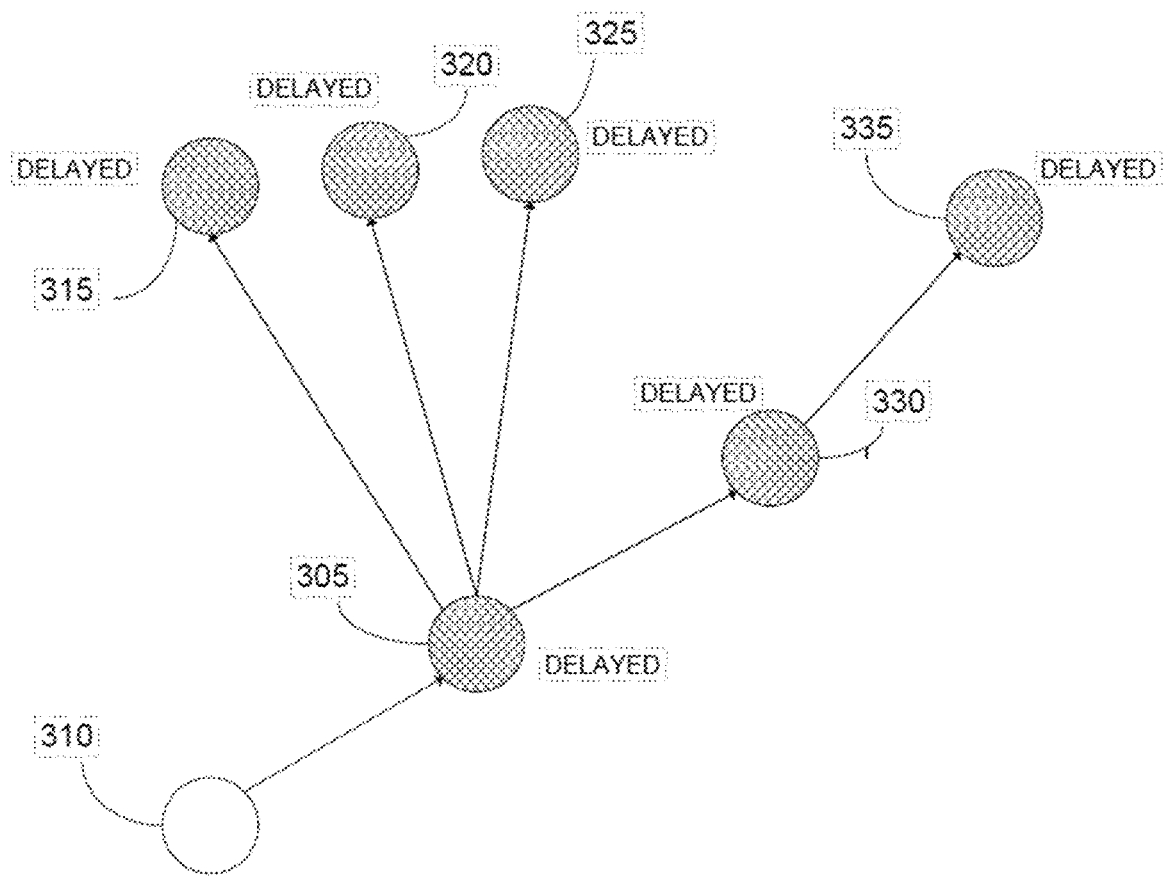
FIG. 4 is a portion of the dependency graph of FIG. 4 which illustrates how the dependency graph depicts propagation of a delay of batch processes according to an embodiment of the present disclosure.

In addition to nodes and edges illustrating dependencies, the dependency graphs of the present disclosure include additional information that is updated in real time during execution of the batch. The information can be status information such as success, fail or delay, or can be quantitative information such as the number of nodes that must be executed before an event is processed. FIG. 4 illustrates the nodes 305-335 and associated edges of FIG. 3 with inclusion of status information. In this case the event associated with node 310 has already been executed (indicated by an empty node). However, the event associated with node 305 is delayed due to an unexpected failure not associated with the execution of node 310. The datamesh module 145 receives information regarding the delay in node 310 and propagates this delay based on the dependencies illustrated in FIG. 4. More particularly, the datamesh module 145 determines all nodes which depend directly (in one step) from node 305. These are determined to be nodes 315, 320, 325 and 330. The datamesh processor updates the status of these nodes to reflect the delay in node 305 as each of nodes 315-330 cannot execute without execution of the node 305. Furthermore, datamesh module determines nodes which are dependent upon nodes 315-330 and finds node 335. The datamesh module then updates the status of node 335 as well to reflect the delay in node 305. In this manner the dependency graph provides comprehensive real-time information concerning the ongoing progress of batch execution.

Recovery and Prediction Engine

As batches are executed, failures can occur in job execution. The reasons for such failure can be detected, and each type of failure is conventionally handled by a standard operating procedure. During processing, a job failure notification can include a failure code, and the operating procedure corresponds to the code. However, this is conventionally done in an ad hoc manner as dependencies of the failure are typically unknown. Referring again to FIG. 1, historical data storage 170, which is coupled to DB4 165 that stores the dependency graph data, stores historical information concerning job failures, failure codes, and related recovery procedures. The information in historical data storage can be accessed by a recovery and prediction module 175 (RP module) which is configured to perform recovery assessments and related predictions. As shown, the recovery engine is also coupled to DB3 160 which is a queue that stores events (both completed and failed) delivered to the queue in real time from the datamesh module 145.

Figure 5A:
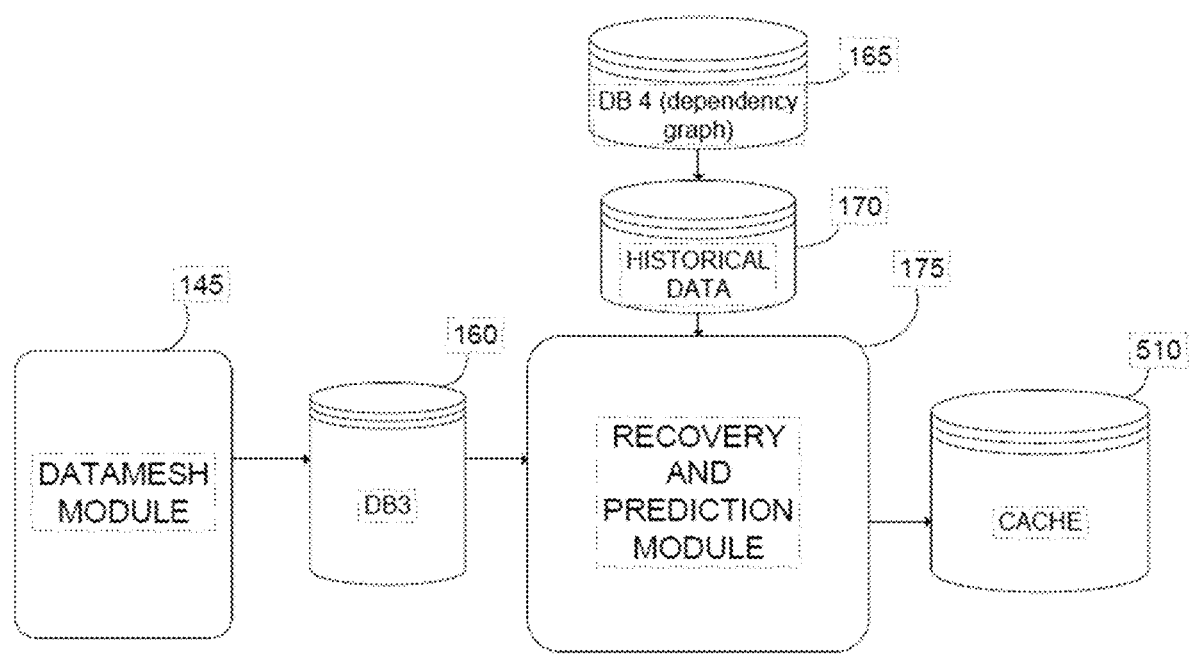
FIG. 5A is an enlarged and more detailed view of the portion of FIG. 1 related to prediction and recovery.

Reference is now made to FIG. 5A, which depicts an enlarged and more detailed view of the recovery-related section of FIG. 1. As shown the RP module 175 receives input from all of DB3 160 including event data, DB4 165 including dependency graph data, and historical data concerning failure modes. In operation, the RP 175 reads events in the queue of DB3 160. If the event of a particular class (e.g., a particular type of job or file transfer) has failed, recovery module 175 determines the failure code associated with the failed event, the position of the event the dependency graph of the relevant batch from DB4 165, and reviews information regarding the type of failure associated with the code in the historical data 170. From the data gathered from these sources, RP module 175 determines whether recovery from the specific failure can be automated for the event class.

For example, there are a number of failures for which the typical recovery procedure is to wait for a period and then restart the event. One difficulty associated with this is knowing how long to wait to restart a particular event. The RP module 175 is configured to predict, using the data concerning dependencies as well as statistical information derived from the historical data, time windows for restarting whole classes of events. This restart prediction effectively automates recovery for a range of events, obviating the need to determine restarting times on an event-by-event basis.

Referring again to FIG. 1, after recovery of an event, data concerning recovered event is sent to a service management system 180, which can be internally or externally hosted. The service management system tracks the recovered event and generates a ticket for resolution of the event. The ticket information is in turn stored in historical data storage 170, adding to the database of failed and recovered jobs and file transfers.

Figure 5B:
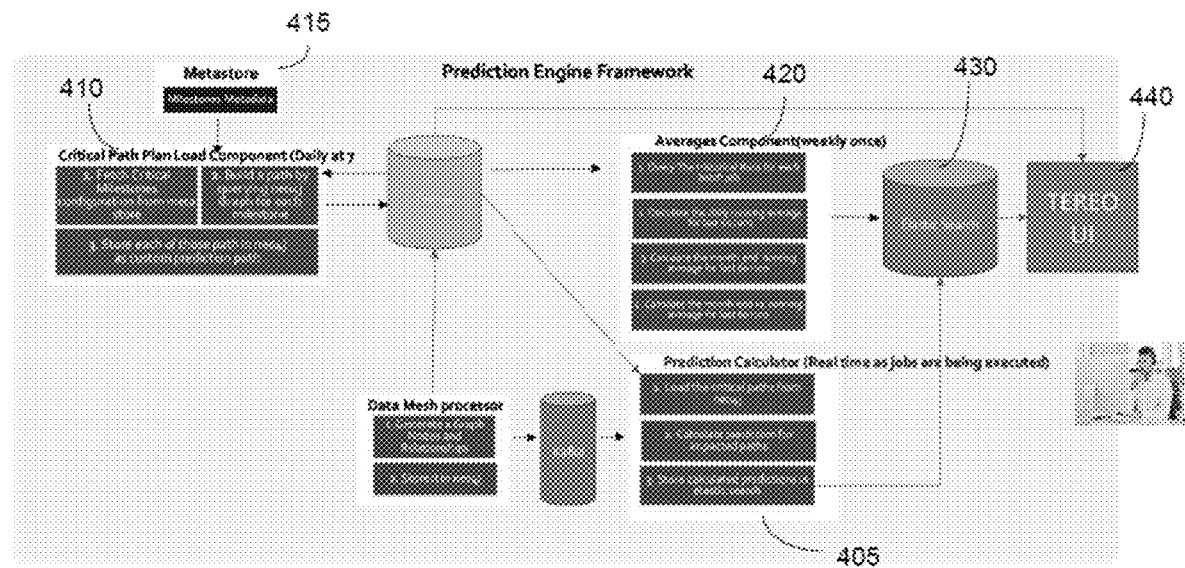
FIG. 5B is a schematic diagram illustrating components and flows of the prediction engine according to the present disclosure.

In addition to automating recovery procedures, the RP module 175 includes a prediction engine that is configured to predict the timing of processing of events in a batch. FIG. 5B is a schematic diagram illustrating components and flows of the prediction engine according to the present disclosure. In the embodiment depicted in FIG. 5B, the prediction engine includes four functional components: a prediction calculator 405, an averaging component 410, a milestones meta store 415, and a critical path plan load component 420. In an exemplary flow, the prediction calculator 405 loads the dependency graph data from DB4 165 including a plurality of related jobs represented as nodes in the graph. From the dependency graph as well as information from a milestones metadata store 415, the critical path plan load component 420 obtains critical milestones, which represent key nodes in the graph that are required as rate limiting steps for other processes. Critical nodes can include such processes as obtaining a feed of data from a source, a specific data processing task required for subsequent tasks, etc. Based on the critical milestones, the critical path load component 420 generates new critical paths for traversing the dependency graph for job execution. Each critical path includes starting nodes and connected successor nodes leading to a final node, completing an execution path through the batch. At the start of the processing day, the critical path plan load component 420 generates new execution paths for nodes within the graph based on the critical milestones. These paths are inserted and stored in the dependency graph at DB4 165.

Once the critical paths through the nodes of the graph are generated, the prediction calculator 405 predicts the amount of time it will likely take to execute each of the jobs among in the critical paths. The predicted start time (Estimated Time of Arrival (ETA)) and end time of each job along a path is calculated, in addition to total times from the beginning to the end of a path. The timing predictions are stored in an elastic search store 430.

The averaging component 410 is configured to calculate average times for jobs in the critical paths (e.g., start time, duration of execution) over a select number of batch runs (e.g., 40, 60, 80 jobs). The averaging component 410 is run periodically, preferably, weekly. The calculated averages are stored with their respective nodes in the dependency graph. The averages are stored based on a particularly day of a month, such as month end, month end+1, etc. Daily averages are calculated as well.

As batches are executed in real time, there is an interaction between the scheduler module and the prediction calculator 420. At the beginning of the execution of a batch, the prediction calculator 405 receives notifications from the scheduler concerning job start times and calculates predicted times for start and end times for jobs within the critical paths. As batch execution proceeds, as circumstances change, the start and end times of successor nodes are updated accordingly in real time from data arriving from DB3 160. A user interface 440 is used to access and display real time data stored in the elastic search store, presenting users with a current view of the status of a batch execution. As completed events are received from DB3 160, the prediction calculator 405 reads the events, traverses the dependency graph and estimates delays along critical paths. Delays are propagated from successor to dependent nodes of the graph. Thus, based on the estimated delays, ETAs are determined for each node in the critical paths. The prediction calculator 405 is configured to execute such predictions periodically (e.g., every 5 minutes) to ensure that ETA information is current based on real time completions in the batch process. The latest updates to predicted ETAs, durations, etc. are stored in the elastic search store 430. Notifications of estimations of delays and ETAs are sent to support staff and other concerned personnel, enabling real time monitoring of the progress of batch execution.

Figure 6:
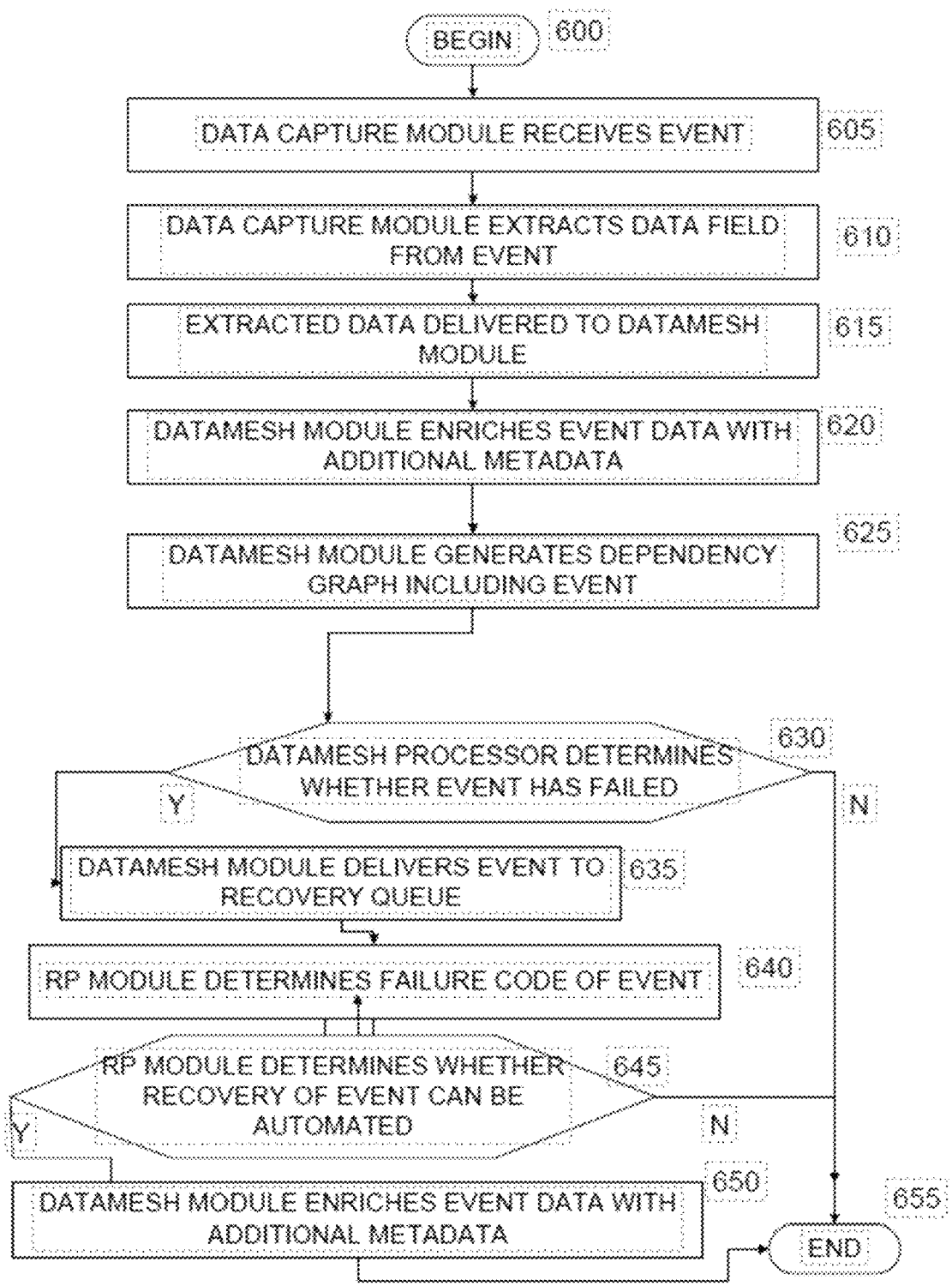
FIG. 6 is a flow chart of an exemplary method for job and file transfer recovery according to an embodiment of the present disclosure.

FIG. 6 is a flow chart of an exemplary method for job and file transfer recovery according to an embodiment of the present disclosure. The method begins in step 600. In a following step 605 a job from a scheduling platform or a file transfer event from a file transfer source is received at the data capture module. In step 610, the data capture module extracts data fields from the job or file transfer event including such information as the name, operator, predecessor, application, and expected start and end times of the event. In step 615 the extracted data along with the events are delivered, via a queue to the datamesh module. In step 620, the extracted data is enriched with metadata. In step 625, the datamesh processor generates a dependency graph including the event and its predecessors and successors is created using the enriched data. In a following step 630, the datamesh processor determines whether the event has failed to execute. If the event has not failed, the method ends in step 655. If the event has failed, in step 635 the datamesh processor delivers the event data to DB3, a recovery queue. In step 640 the RP module reads the event data and determines a failure code associated with how the event failed, as well as the dependency graph information associated with the event and historical data concerning failure code. In step 645, the RP module determines, using the information gathered in step 640 whether recovery from the specific failure (failure mode) can be automated for the event class. If the failure mode cannot be automated, the method ends in step 655. If the RP module determines that the failure mode can be automated, the recovery engine processes the recovery in an automated manner in step 650. The method then ends in step 655.

Figure 7:
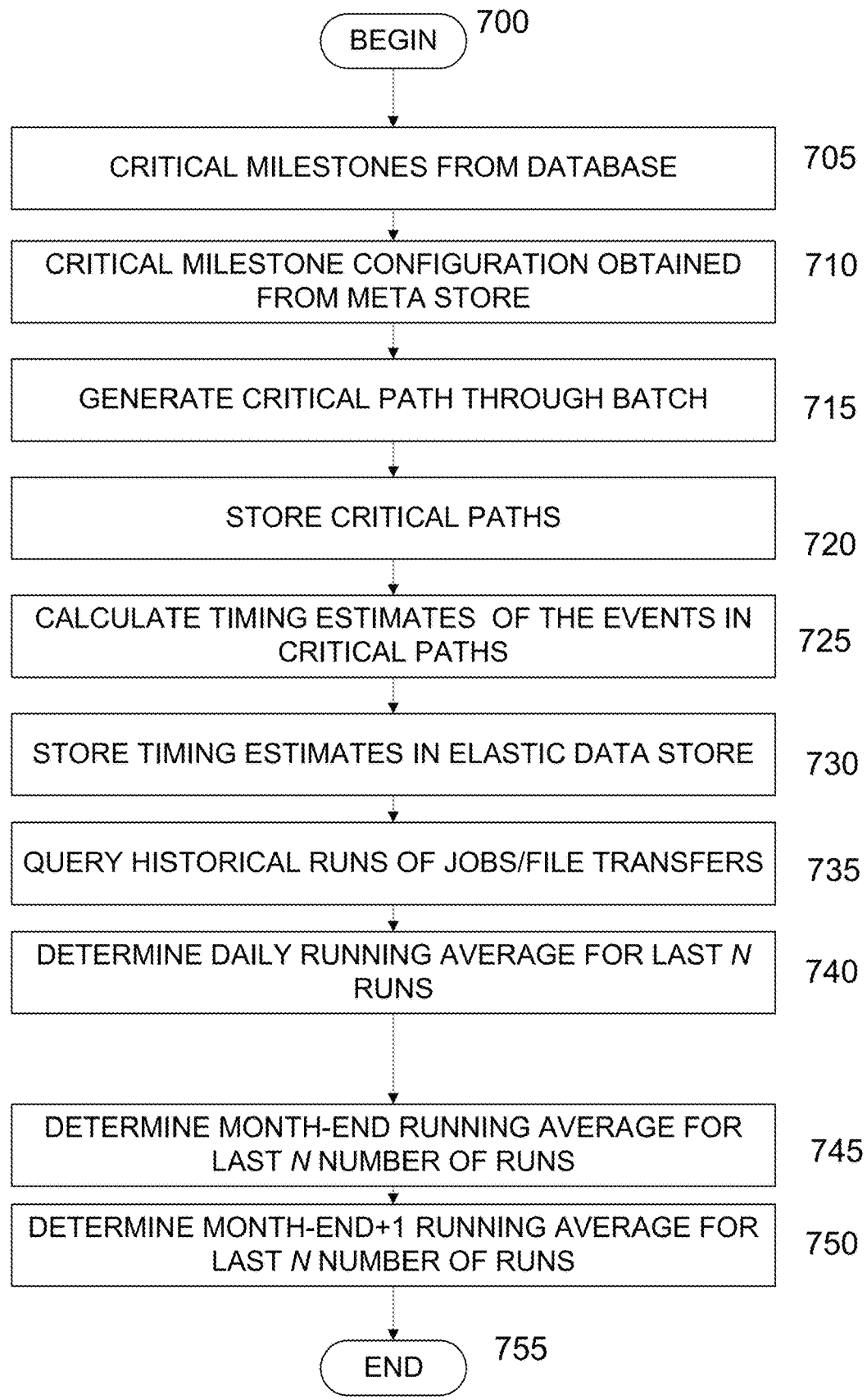
FIG. 7 is a flow chart of an exemplary method for predicting the timing of processing of events in a batch according to the present disclosure.

FIG. 7 is a flow chart of an exemplary method for predicting the estimated times of arrival and for processing of events in a batch in real time. The method begins in step 700. In step 705, the prediction calculator 405 loads critical milestone from the dependency graph database DB4. In step 710, the critical path load component 420 obtain milestone configuration data from meta store 415. In step 715, the critical path load component 420 generates a critical path through a batch by querying DB4 for each milestone. In a following step 720, the generated critical paths are stored in DB4. Once the critical paths are stored, both the predictor calculator 405 and averaging component 410 can perform calculations based on the critical paths. While the following steps performed by the predictor calculator 405 and averaging component are listed sequentially, these steps can be performed in different orders or in parallel based on operator choices. In the implementation of the flow shown in FIG. 7, in step 725, the prediction calculator 405 calculates time predictions for the critical paths. including estimated times of arrival (ETAs) of the various jobs and file transfers in the paths. In step 730, the predictor calculator 405 stores the time predictions in elastic search data store 430. In the following steps, execution switches to the averaging component. In step 735, averaging component 410 queries historical runs for each job and file transfer. The daily running average for the last n number runs is determined from the results of the query is step 740. In some implementations, the number "n" is set at 60 runs, but other numbers of runs can be used. Similarly, in step 745, the month-end running average for last n number of runs is determined. In step 750, the "month-end+1" running average for the last n number of runs is also determined. The method ends in step 755.

The system and method for observing and predicting data batch activity in real time has a number of advantages that have not been available previously. The system and method enable batches to be converted into nodes and edges of a dependency graph for multiple scheduling platforms. This conversion enables a critical path for execution of each night's batch run. As the batches are executed, the dependency graph information is updated with real time information such as status, run time, predictions, etc. Technology support and advisors are thereby able to monitor the batch in real time. As the batch is in progress, the recovery and prediction module continually predicts job completion times based on predecessor delays/failures, etc. Delay impacts are broadcast to other personnel based on business function and applications. Additionally, the due to the automated recovery capabilities of the batch processing system and method disclosed herein, a vast number of job (e.g., in the range of 1 million) can be processed in an automated by resolving recurring issues without manual intervention. Potential issues are proactively addressed through monitoring as well. These capabilities are especially useful for technology support. It has been found that the disclosed system and method reduce the mean time to identify and resolve issues by forty percent and reduce manual support tasks by fifty percent.

The methods and processes described herein are performed by multiple computing devices (e.g., user devices, physical servers, workstations, storage arrays, cloud computing resources, etc.) that communicate and interoperate over one or more networks to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions or may be implemented in application-specific circuitry (e.g., ASICs or FPGAs) of the computer system. Where the computer system includes multiple computing devices, these devices can be, but need not be, co-located. The results of the disclosed methods and tasks can be persistently stored by transforming physical storage devices, such as solid-state memory chips or magnetic disks, into a different state. In some embodiments, the computer system may be a cloud-based computing system whose processing resources are shared by multiple distinct business entities or other users.

The methods described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium.

The modules described herein which are executed on one or more computing devices and information processors which can communicate with other information processors within the organization and outside of the organization sing data connections over a data network. Data connections can be any known arrangement for wired (e.g., high-speed fiber) or wireless data communication, using any suitable communication protocol, as known in the art.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

While the disclosure has been described with reference to exemplary embodiments, it will be understood by those skilled in the art that various changes may be made and equivalents may be substituted for elements thereof without departing from the scope of the disclosed invention. In addition, many modifications will be appreciated by those skilled in the art to adapt a particular instrument, situation or material to the teachings of the disclosure without departing from the essential scope thereof. Therefore, it is intended that the invention not be limited to the particular embodiment disclosed as the best mode contemplated for carrying out this invention, but that the invention includes all embodiments falling within the scope of the appended claims.

What is claimed is:

1. A computer-implemented method for monitoring and predicting data batch activity in real time comprising:
    obtaining i) ordered lists of jobs of a batch from one or more scheduling platforms including and ii) information related to file transfers from one or more file transfer sources, the ordered lists and information related to file transfers being updated in real time;
    extracting data from the ordered and the information from the one or more file transfer sources;
    enriching the extracted data using additional information retrieved from at least one meta data repository;
    generating a dependency graph that includes real time job and file transfer data obtained from the enriched data in which nodes of the graph represent events and edges represent relationships between the nodes indicating a dependence, wherein if one event is dependent on the execution of a prior event, the event is considered dependent on the prior event;
    obtaining critical milestones from the dependency graph;
    generating critical paths for traversing the dependency graph for job and file transfer execution using the milestones; and
    predicting in real time, times for execution of each of the jobs and file transfers in the critical paths.

2. The computer-implemented method of claim 1, further comprising calculating an average time for completion of each job and file transfer event in the dependency graph.

3. The computer-implemented method of claim 1, wherein the times for execution of each of the jobs and file transfers include an estimated time of arrival (ETA), and an estimated end time for each job and file transfer in a critical path.

4. The computer-implemented method of claim 1, further comprising:
    receiving notification of a specific failed job or file transfer;
    determining a failure code for the specific failed job or transfer;
    determining a position of the specific failed job or transfer in the dependency graph;
    obtaining historical data concerning failure modes of the jobs and file transfers; and
    determining whether recovery of an event class corresponding to the specific failed job or file transfer can be automated based on the failure code, position of the specific failed job or transfer in the dependency graph, and historical data corresponding to the failure code.

5. The computer-implemented method of claim 1, further comprising:
    updating the dependency graph with a status of jobs and file transfers in real time, wherein the status indicates whether a job or file transfer has been delayed, failed or successfully executed on time; and
    updating the predicted times for execution of each of the jobs and file transfers in the critical paths in real time based on the current status of the jobs and file transfers.

6. The computer-implemented method of claim 1, further comprising:
    storing the data extracted from the ordered lists of jobs and real time event information received from the one or more scheduling platforms and the information from the one or more file transfer sources in a first database prior to enriching the data.

7. The computer-implemented method of claim 1, further comprising:
    storing the dependency graph in a second database after generating the dependency graph.

8. The computer-implemented method of claim 1, further comprising translating and assembling the extracted data into a standard format.

9. The computer-implemented method of claim 8, wherein the standard format is a JSON template.

* * * * *